United States Patent
Meredith et al.

(10) Patent No.: US 10,282,052 B2
(45) Date of Patent: May 7, 2019

(54) APPARATUS AND METHOD FOR PRESENTING INFORMATION ASSOCIATED WITH ICONS ON A DISPLAY SCREEN

(71) Applicants: AT&T INTELLECTUAL PROPERTY I, LP, Atlanta, GA (US); AT&T Mobility II LLC, Atlanta, GA (US)

(72) Inventors: Sheldon Kent Meredith, Marietta, GA (US); Brandon B Hilliard, Woodstock, GA (US); William Cottrill, Canton, GA (US)

(73) Assignees: AT&T Intellectual Property I, L.P., Atlanta, GA (US); AT&T Mobility II LLC, Atlanta, GA (US)

(*) Notice: Subject to any disclaimer, the term of this patent is extended or adjusted under 35 U.S.C. 154(b) by 483 days.

(21) Appl. No.: 14/884,481

(22) Filed: Oct. 15, 2015

(65) Prior Publication Data
US 2017/0109009 A1    Apr. 20, 2017

(51) Int. Cl.
| | |
|---|---|
| *G06F 3/0488* | (2013.01) |
| *G06F 3/0481* | (2013.01) |
| *G06F 3/01* | (2006.01) |
| *G06F 3/16* | (2006.01) |
| *H04L 29/08* | (2006.01) |
| *H04W 4/80* | (2018.01) |
| *H04W 84/12* | (2009.01) |

(52) U.S. Cl.
CPC .......... *G06F 3/04817* (2013.01); *G06F 3/016* (2013.01); *G06F 3/0488* (2013.01); *G06F 3/167* (2013.01); *H04L 67/10* (2013.01); *H04L 67/16* (2013.01); *H04W 4/80* (2018.02); *H04L 67/18* (2013.01); *H04W 84/12* (2013.01)

(58) Field of Classification Search
CPC .......... G06F 3/16; G06F 3/167; G06F 3/0488; H04L 67/10; H04M 1/72588
USPC ........................................ 715/729, 864, 865
See application file for complete search history.

(56) References Cited

U.S. PATENT DOCUMENTS

| | | |
|---|---|---|
| 6,285,351 B1 | 9/2001 | Chang et al. |
| 8,452,600 B2 | 5/2013 | Fleizach |
| 8,605,141 B2 | 12/2013 | Dorcey et al. |
| 8,681,106 B2 | 3/2014 | Fleizach et al. |
| 8,711,118 B2 | 4/2014 | Short et al. |

(Continued)

FOREIGN PATENT DOCUMENTS

WO    2015026857    2/2015

OTHER PUBLICATIONS

"Apple Looking to deliver a little More Buzz to iOS Devices", www.patentlyapple.com, Mar. 22, 2012.

(Continued)

*Primary Examiner* — Rinna Yi
(74) *Attorney, Agent, or Firm* — Guntin & Gust, PLC; Douglas Schnabel (57) ABSTRACT

Aspects of the subject disclosure may include, for example, detect a first user interaction with a control button, disable an initiation of an action for a communication service, detect a second user interaction with the icon, and transmit an identification signal to a second communication device that causes the second communication device to present identification information describing the action for the communication service. Other embodiments are disclosed.

17 Claims, 6 Drawing Sheets

(56) References Cited

U.S. PATENT DOCUMENTS

| | | |
|---|---|---|
| 8,751,971 B2 | 6/2014 | Fleizach et al. |
| 8,896,524 B2 | 11/2014 | Birnbaum et al. |
| 9,009,612 B2 | 4/2015 | Hudson et al. |
| 9,013,426 B2 | 4/2015 | Mohammed et al. |
| 9,063,570 B2 | 6/2015 | Weddle et al. |
| 2003/0208356 A1* | 11/2003 | King ............... G10L 13/00 704/270 |
| 2009/0006991 A1* | 1/2009 | Lindberg ............ G06F 3/04817 715/763 |
| 2010/0289757 A1 | 11/2010 | Budelli et al. |
| 2012/0327009 A1 | 12/2012 | Fleizach et al. |
| 2013/0156435 A1* | 6/2013 | Hsieh ............... G08C 23/04 398/106 |
| 2013/0311881 A1 | 11/2013 | Birnbaum et al. |
| 2014/0123018 A1 | 5/2014 | Park et al. |
| 2014/0232944 A1 | 8/2014 | Walker et al. |
| 2014/0253687 A1 | 9/2014 | Lee et al. |
| 2014/0281954 A1 | 9/2014 | Ullrich et al. |
| 2015/0035780 A1 | 2/2015 | Birnbaum et al. |
| 2015/0070150 A1 | 3/2015 | Levesque et al. |
| 2015/0080060 A1 | 3/2015 | Rodriguez |
| 2015/0278534 A1* | 10/2015 | Thiyagarajan .......... G06F 21/62 726/28 |
| 2015/0382061 A1* | 12/2015 | Maisenbacher .... H04N 21/4542 725/28 |

OTHER PUBLICATIONS

"Qualcomm and Project RAY Announce the Development of an EyeFree Mobile Device to Facilitate Daily Life for Blind and Visually Impaired People", www.qualcomm.com, Oct 22, 2012.

Pietrzak, Thomas et al., "Creating usable pin array tactons for nonvisual information", Haptics, IEEE Transactions on 2.2 (2009): 6172.

Symeonidis, Stefanos , "The use of tactile feedback for mobile devices", www.academia.edu. Uploaded to Academia.edu 2014.

* cited by examiner

APPARATUS AND METHOD FOR PRESENTING INFORMATION ASSOCIATED WITH ICONS ON A DISPLAY SCREEN

FIELD OF THE DISCLOSURE

The subject disclosure relates to an apparatus and method for presenting information associated with icons on a display screen.

BACKGROUND

Display screens for communication devices can be utilized to access or otherwise interact with various communication services through use of icons presented on the display screen. Some icons, and their associated actions, are well known while other icons are not well understood.

Display screens have a limited area to present information. Further, display screens may not be helpful to users that are visually impaired or otherwise unable to clearly see the information being presented at the particular display screen

BRIEF DESCRIPTION OF THE DRAWINGS

Reference will now be made to the accompanying drawings, which are not necessarily drawn to scale, and wherein.

DETAILED DESCRIPTION

The subject disclosure describes, among other things, illustrative embodiments for presenting information descriptive of icons that are in a Graphical User Interface (GUI) or on a touch sensitive display of a communication device. The information can be rendered or otherwise presented on another device which can facilitate the ability of a user to comprehend what actions are associated with the particular icons. The information can be presented in various presentation formats including via audio and/or haptic communications such as for the benefit of users that are visually impaired. Other embodiments are described in the subject disclosure.

One or more aspects of the subject disclosure include disabling or suspending actions that are initiated by one or more icons while a user probes those icons and while information describing or otherwise associated with those icons is presented on another device.

One or more aspects of the subject disclosure include a first communication device including a touch sensitive display; a processor coupled with the touch sensitive display; and a memory that stores executable instructions that, when executed by the processor, facilitate performance of operations. The processor can present a first icon on the touch sensitive display and can detect a first user interaction with the first icon. The processor can present a second icon on the touch sensitive display where the second icon is associated with an initiation of an action for a communication service; and can, responsive to the first user interaction with the first icon, disable the initiation of the action for the communication service. The processor can detect a second user interaction with the second icon. The processor can, responsive to the first user interaction with the first icon and the second user interaction with the second icon, transmit an identification signal to a second communication device that causes the second communication device to present identification information describing the action for the communication service. The processor can detect a third user interaction with the first icon. The processor, responsive to the third user interaction with the first icon, can enable the initiation of the action for the communication service.

One or more aspects of the subject disclosure include a machine-readable storage medium, comprising executable instructions that, when executed by a processor of a first communication device, facilitate performance of operations, including detecting a first user interaction with a control button. The processor can present an icon on a touch sensitive display of the first communication device, where the icon is associated with an initiation of an action for a communication service. The processor can, responsive to the first user interaction with the control button, disable the initiation of the action for the communication service. The processor can detect a second user interaction with the icon and can, responsive to the first user interaction with the control button and the second user interaction with the icon, transmit an identification signal to a second communication device that causes the second communication device to present identification information describing the action for the communication service.

One or more aspects of the subject disclosure are a method that includes receiving, by a second communication device from a first communication device, an identification signal, where the receiving of the identification signal is responsive to a first user interaction with a control button of the first communication device and responsive to a second user interaction with an icon displayed on a touch sensitive display of the first communication device. An initiation of an action for a communication service at the first communication device is disabled by the first communication device responsive to the first user interaction with the control button at the first communication device, where the identification signal includes metadata describing the action for the communication service. The method can include, responsive to the identification signal, presenting, by the second communication device, identification information associated with the action based on the metadata, where the presenting of the identification information is via audio communication, haptic communication, or both.

Figure 1:
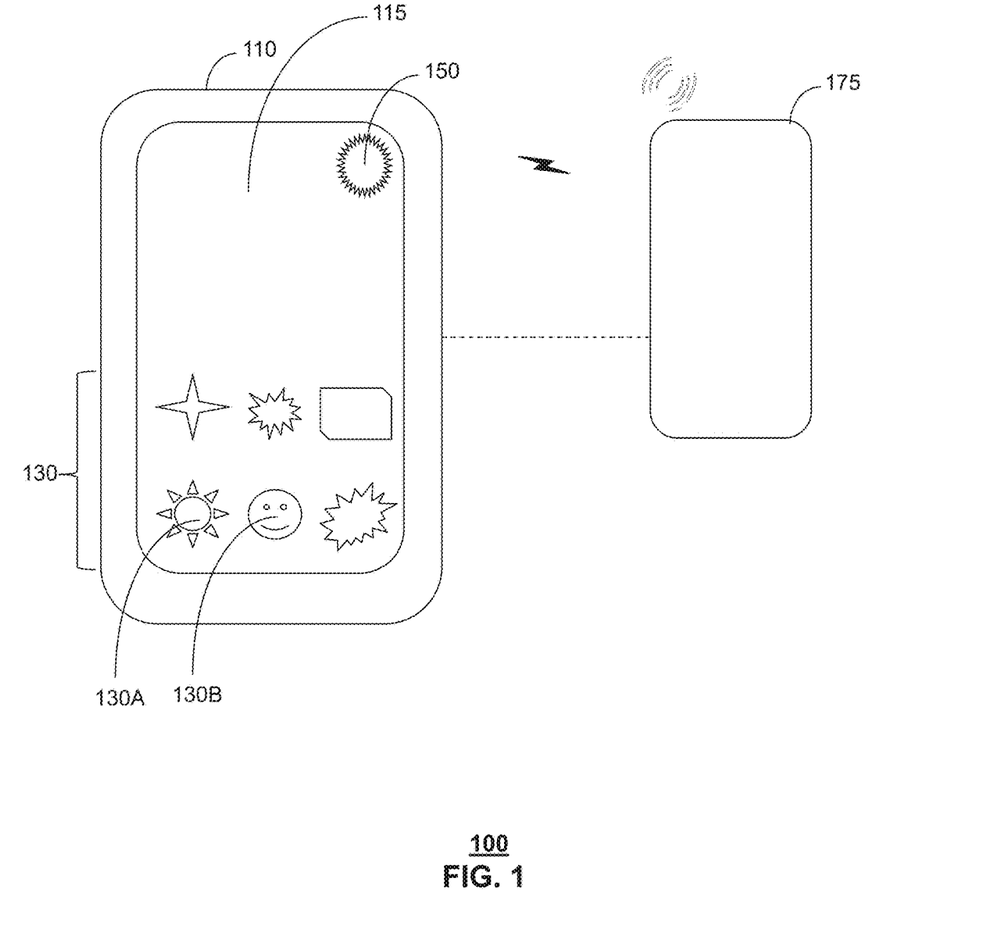
FIG. 1 depicts an illustrative embodiment of a system that enables presentation of identification information associated with actions that can be initiated by an icon of a communication device.

FIG. 1 depicts an illustrative embodiment of a system 100 for facilitating the presentation of information associated with GUI icons. The information can be various types of identification information. For example, the information can be descriptive of the action that will be initiated by actuation of the icon. The identification information can provide details associated with the action and/or associated with a communication service of the action, such as pricing information, service provider identification, communication parameters (e.g., protocol type, bandwidth usage, time parameters), alternative actions/services, and so forth.

System 100 can include a first communication device 110 that includes a touch sensitive display 115. Device 110 can be various types of devices including a mobile phone, a tablet, a display device, a personal digital assistant, a vehicle communication system, or any other end user device that enables communication service(s), such as voice, video, data and/or messaging services. Display 115 can present one or more icons 130 that can be pressed or otherwise actuated (e.g., scrolling) by user interaction or contact to initiate or cause an action, such as associated with a communication service. The action can be any type of action including transmitting data or other signals to a network server for the communication service (e.g., transmitting a request to download a particular movie) and/or receiving data or other signals from a network server for the communication service. In one embodiment, the action can be transmitting signals that enable establishing a communication session between the communication device and a network server where the communication service is provided via the communication session, such as delivering voice, video, content and/or messaging. In another embodiment, the action can be launching a web browser that enables access to a website associated with the communication service.

As an example, each of these icons 130 can be associated with launching a different application that provides a communication service at the device 110. The communication service can include communications between the device 110 and another device (e.g., another end user device, a content server, a gaming server, and so forth). The communication service can also include launching an application that does not require transmitting communications from the device 110, such as launching a video game that is resident on the device 110.

Communication device 110 can present or otherwise include a control button 150. As an example, control button 150 can be a control icon that is presented on the touch sensitive display 115. However, the control button 150 can also be a physical button or other structure of device 110 that can be actuated by the user. User interaction with the control button 150 can disable or otherwise suspend actions associated with one or more of the icons 130. Once the actions are suspended or otherwise temporarily disabled, a user can then probe the display 115 to obtain information associated with the icons 130.

For example, a user can press control button 150 which causes actions, which would normally be initiated by pressing any of the icons 130, to be disabled. The user can then put his or her finger on one of the icons (e.g., icon 130A) which causes the communication device 110 to transmit an identification signal to a second communication device 175. Device 175 can be various types of devices such as an audio device, a haptic device, a braille glove, a mobile phone, a tablet, a set top box, a desk top computer, and so forth. The second communication device 175, responsive to receiving the identification signal, can present identification information describing or otherwise associated with the action that would be initiated by the icon 130A.

For instance, icon 130A can be a download icon for accessing music in a playlist. In one embodiment, the icon 130A can graphically indicate that the icon enables downloading music (e.g., presenting an identification indicia of text or showing an illustration of musical notes on the touch sensitive screen 115). The communication device 175 can, responsive to the actuation of control button 150 and user interaction with icon 130A (at communication device 110), present identification information indicating that icon 130A enables downloading particular music. The identification information can include various information associated with the music download communication service. For example, the identification information presented by the communication device 175 can include a description that icon 130A enables downloading music and can further provide additional information for the user, such as one or more of song titles, song artists, pricing, other available songs, and so forth.

The communication device 175 can present the identification information for icon 130A using various presentation formats including audio, haptic and/or graphically. In one embodiment, the particular presentation format for the identification information can be selected based on user input and/or user preferences. As an example, a visually impaired user may desire to listen to an audio message describing the music download of icon 130A, while a user that is not visually impaired may desire to see the identification information on a display of the communication device 175. In another example, the communication device 175 can be a braille glove (or another braille type device) where vibrations or other motion is communicated which can be detected (and read as braille) by the user.

In one embodiment, another user interaction with the control button 150 can then enable the action to be initiated. For example, the user can hold down control button 150 and while the control button is being held down the actions initiated by icons 130 can be disabled. Once, the user releases the control button 150 then the actions can again be enabled. In one embodiment, the user can then again press or otherwise interact with the particular icon (e.g., icon 130A) to initiate the communication service action.

In one embodiment, the identification signal transmitted from the first communication device 110 to the second communication device 175 is via wireless communication. In another embodiment, the identification signal transmitted from the first communication device 110 to the second communication device 175 is via a hardwire connection between the first and second communication devices.

In one embodiment, the identification information being presented by the second communication device 175 can be based on metadata stored in a memory of the communication device 110. For instance, the metadata can include the identification information describing the action for the communication service. Some or all of the stored metadata for an icon 130 can be transmitted from the first communication device 110 to the second communication device 175 with the identification signal. In one embodiment, a user can select categories or types of descriptions that are to be presented by the second communication device 175. For example, a user may prefer that titles on a playlist are presented by the communication device 175 but that the artists are not presented. A user can customize the identification information to be presented at the communication device 175 by selecting categories or types of descriptive information that he or she desires or does not desire to be presented. The customization or control of the identification information presented by the communication device 175 can be implemented at the device 110 and/or at the device 175. For example, a user can provide user preferences stored at device 110 that controls the metadata provided to the device 175 and thus controls the identification information presented at the device 175. In another embodiment, the user can provide user preferences to the communication device 175 (e.g., via a user interface of the device 175 or via another device such as the communication device 110) so that the filtering or control over the identification is performed at the communication device 175. The control or customization of the identification information is not limited to filtering out portions of descriptive information. For instance, a user can control the format of the presentation, such as selecting that the identification information is to be presented both graphically and audibly at the communication device 175.

In one embodiment, one or more of the icons 130 may not initiate any particular action for the communication service but rather causes additional information to be provided with respect to the communication service. For example, icon 130B can be an icon that is presented within a GUI of an application such as a map. By interacting with icon 130B, the user can be presented with additional information for the mapping communication service, such as where icon 130B represents a place of interest on the map and where the place of interest is then described at the second communication device 175 in response to the user interaction with the icon 130B.

Figure 2:
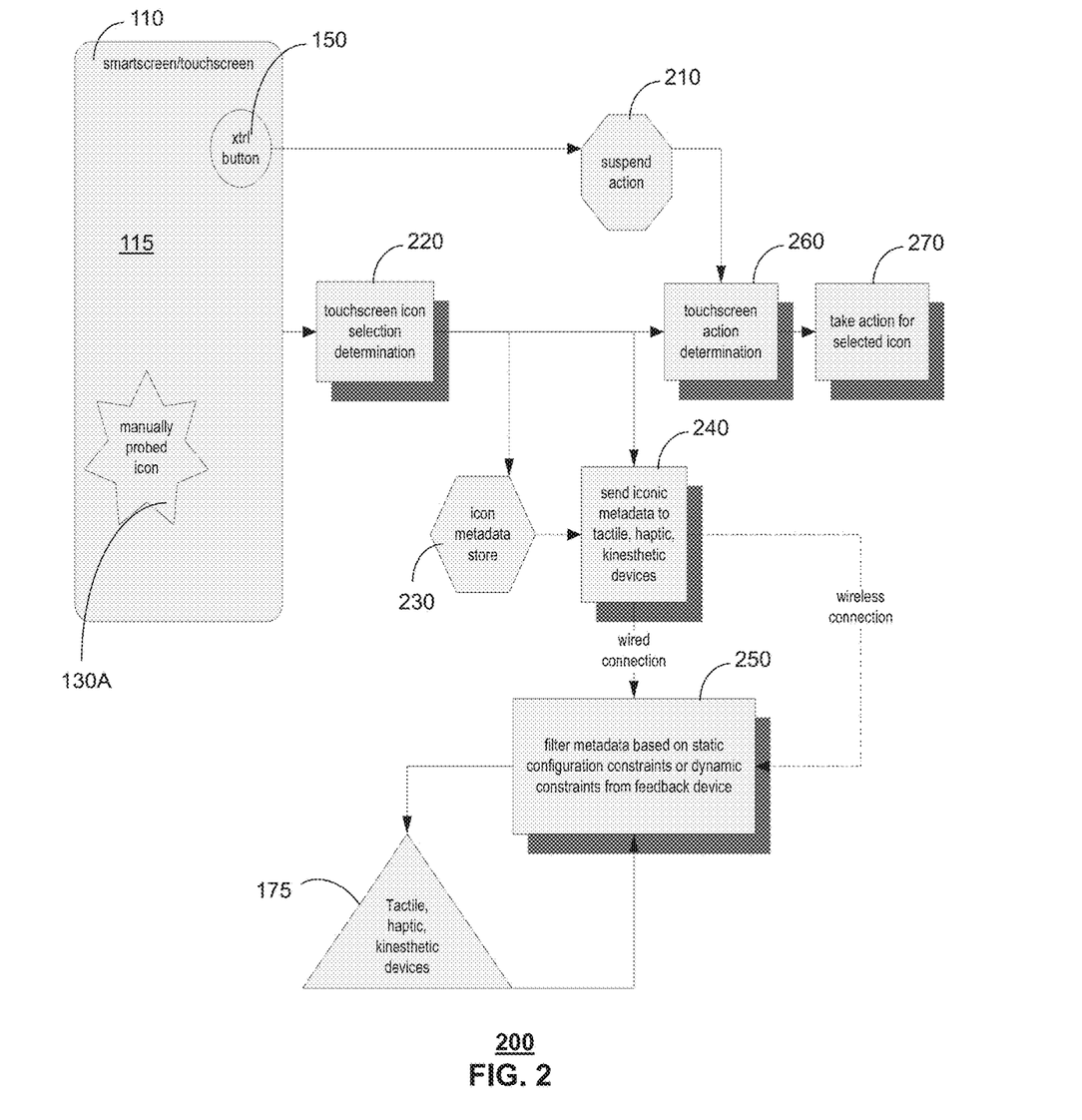
FIG. 2 depicts an illustrative embodiment of a data flow for the system of FIG. 1.

FIG. 2 depicts an illustrative embodiment of a communication flow 200 for the communication device 110 and the communication device 175. In one or more embodiments, the communication device 110 can be adapted with software to enable presenting information (at device(s) 175) descriptive of icons provided on the touch sensitive display 115 of the communication device 110. In another embodiment, the communication device 110 can be adapted with the software to enable the presenting of the information at device 175 without making any structural adjustments to the communication device 110.

In one embodiment, user interaction with control button 150 causes action(s) (associated with icon 130A or other icons that can be probed) to be temporarily suspended at 210. This allows a user to manually probe the smartscreen 115 without initiating any actions associated with the particular icon(s) being probed. For example during this user probing, the communication device 110 can detect icons that are being touched or otherwise interacted with by the user at 220 and metadata of each touched icon can be accessed by the communication device 110 at 230. At 240, the metadata (or a portion thereof that is selected based on user preferences or other factors including capabilities of the communication device 175) can be sent (e.g., via a wired or wireless connection) to the communication device 175 so that the user can be provided information to understand what they are touching. In one embodiment, the metadata can be filtered as shown at 250. In one embodiment, the transmitted data can also include relative and/or absolute position information on the smartscreen 115.

Once a user finds an icon that the user wants, the user can depress the control button 150 (e.g., while still touching the icon 130A), thereby allowing the action to be taken at 260 and 270. Other techniques for initiating the action of the icon 130A can also be utilized, such as detecting a second user interaction with the icon after the control button 150 is released.

In one or more embodiments, not all of the icons need to have associated actions and some icons may be exclusively informational. For instance, the metadata associated with an icon(s) or action could be extensive, including not only a visual description, but also a wealth of other details, that are not easily represented on the smartscreen 115. For example, when using a map application, a user can search for a location where push-pins are presented, but require the user to touch the push-pins to display their underlying information. If the metadata of the push-pin includes all of the underlying details, then a visually impaired user could suspend actions of the icons of the smartscreen 115, touch the push-pin and receive any of the metadata associated with it (via the communication device 175) even prior to releasing screen actions.

In one or more embodiments, the technique for communicating the metadata to one or more tactile/haptic/kinesthetic devices (i.e., device 175) can be via low power RF, ultrasonic communications or via other modes of communications. In one embodiment, the metadata communicated can be statically filtered depending on the needs or desires of the user including a user who is blind or otherwise visually impaired, or unimpaired, but nonetheless desiring to get non-visual inputs about the screen icons. In one embodiment, the tactile/haptic/kinesthetic devices (i.e., device 175) can be dynamically filtered by the user depending on what the user desires to know about the icon(s) 130A and its associated action or communication service.

In one embodiment, the metadata can include a visual description of the icon 130A, but the user may be a sighted user who can see the icon but desires to learn more about the action or communication service, so the user configures the communication device 110 to not send this portion of the metadata to communication device 175. In another embodiment, a user can select which component of the metadata he or she wishes to either have communicated to or presented by the communication device 175 in a variety of ways including voice control and/or selection switches.

In one embodiment, other types of user interaction can control the information being transmitted by communication device 110 and/or presented by the communication device 175, such as detecting an angle of bending of a finger or thumb. This detection allows one hand to be used for holding the communication device 110 (e.g., a smartphone) and the same hand to be used to suspend or un-suspend actions. In this example, the other hand can then be used to probe the screen, while only one finger is required to do so. This leaves the remaining phalanges of that hand to dynamically select among the metadata simply by adjusting the angle of bend of the phalange. For instance, the user can suspend screen actions by pressing a button on the smartphone or computing device smartscreen 115, scan the smartscreen manually while receiving tactile feedback, and can then decide to probe further into the metadata by bending a thumb or finger by a variable amount, causing the metadata to effectively "scroll." Other techniques can also be used including pressure-sensitive switches where an amount of pressure indicates the position in the metadata. In this example, the user, having "searched" through the metadata, may decide that he or she has found what he or she is looking for and can then decide to select the action of the probed icon simply by releasing the control button which allows the touch-sensitive feature of the screen to effect the action.

Figure 3:
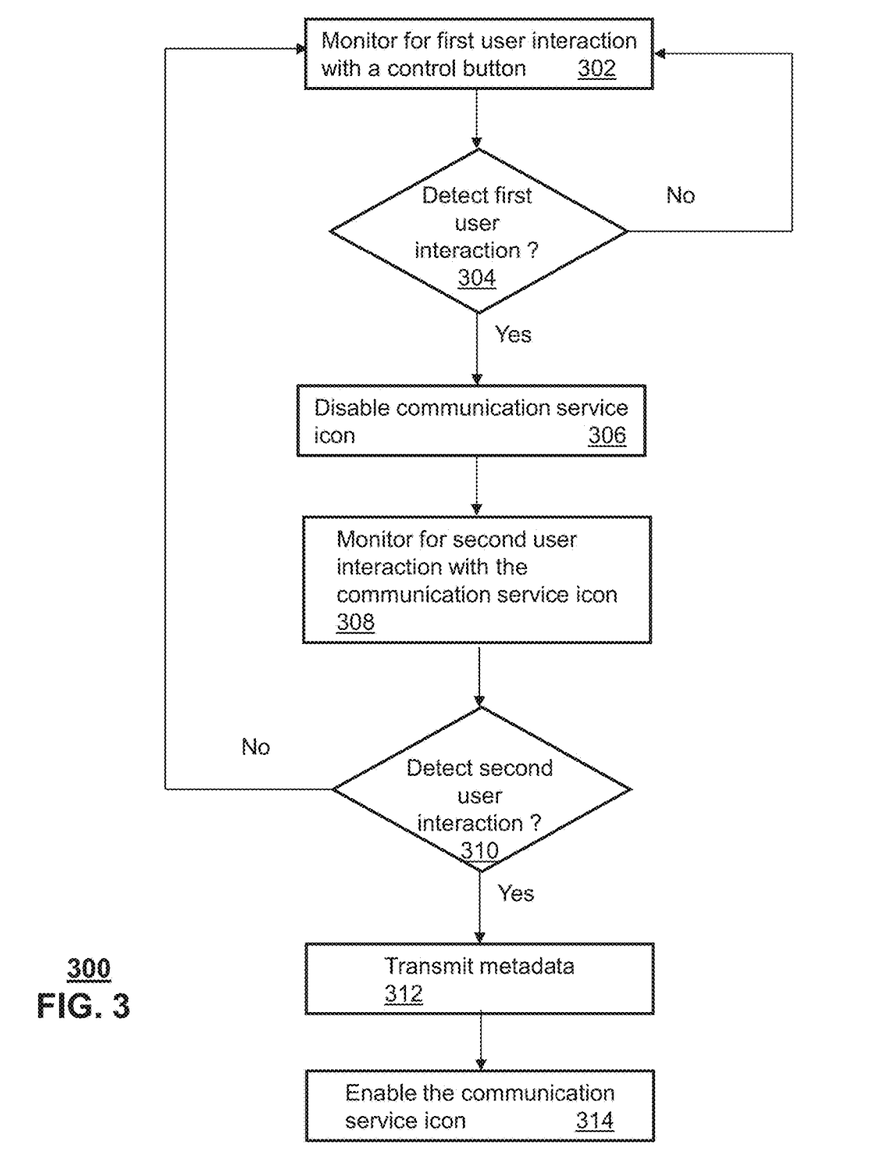
FIG. 3 depicts an illustrative embodiment of a method used in portions of the system described in FIG. 1.

FIG. 3 depicts an illustrative embodiment of a method 300 used by system 100 of FIG. 1 and implementing the flow 200 of FIG. 2. At 302, the communication device 110 can monitor for a request by a user to suspend icon actions. For example, the control button 150 can be presented on the smartscreen 115. However, other techniques can be used for suspending icon actions, including voice activated commands, motion sensing utilized to detect a particular pattern of motion indicating a suspension request, and so forth. In one embodiment, the detected user interaction with the control button 150 can be pressing and holding down the control button.

If the user interaction is detected at 304 then at 306 the communication device 110 can suspend or otherwise disable actions that would normally be initiated by user interaction with an icon being presented on the smartscreen 115. The disabling of icons can be for all icons presented at the smartscreen 115 or only a portion of those icons (e.g., according to user preferences, a type of action that would be initiated by the particular icons, a type of communication service associated with the particular icons, and so forth).

Communication device 110 can at 308 monitor for user probing of the icons being presented at the smartscreen 115. For example, the communication device 110 can detect at 310 user contact with an icon that has been disabled (at 306). For instance, a user can slide his or her finger across the smartscreen 115 to make contact with one or more disabled icons. Responsive to the user interaction with the disabled icon, at 312 the communication device 110 can transmit an identification signal to a second communication device (e.g., device 175) that causes the second communication device to present identification information describing the action associated with the icon being probed. As described herein, the identification information can include various information that enables a user to understand what will occur if the particular action associated with the icon is initiated. The identification information can be as simple as a descriptive phrase (e.g., music download, web browser, Google Earth) or can be as detailed as providing more information than can fit on a single GUI screen.

At 314, the disabled icon can be enabled or otherwise unsuspended, such as responsive to another user interaction with the control button 150 (e.g., releasing the control button that was being held down) and/or responsive to the presenting of the identification information at the device 175 (e.g., where the device 174 provides a notification to the device 110 that the identification information has been presented by the device 175).

While for purposes of simplicity of explanation, the respective processes are shown and described as a series of blocks in FIG. 3, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Figure 4:
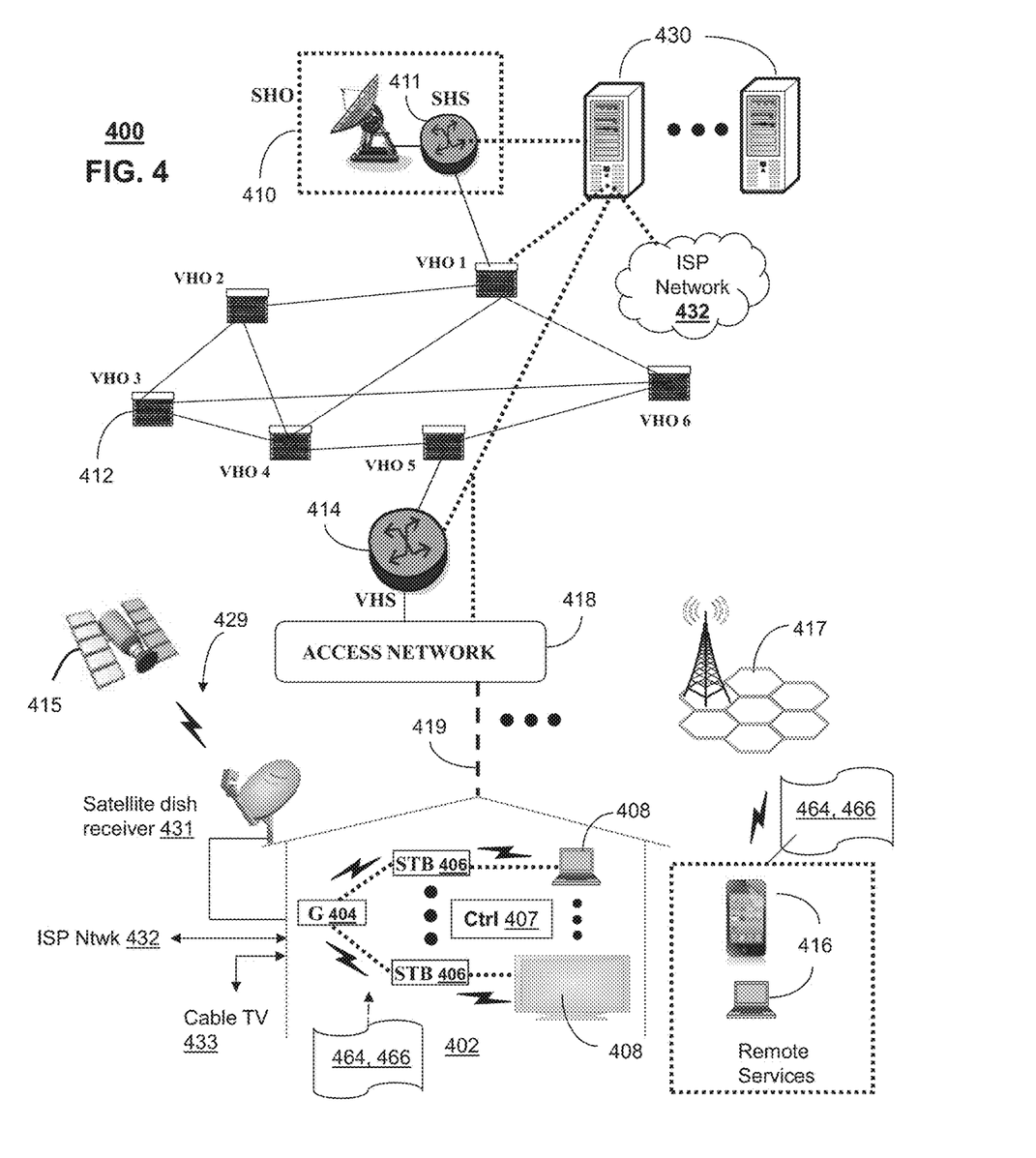
FIG. 4 depicts an illustrative embodiment of a communication system that provides media services and that can present identification information associated with actions that can be initiated by an icon of a communication device.

FIG. 4 depicts an illustrative embodiment of a communication system 400 for delivering media services, such as delivering media content. The communication system 400 can represent an interactive television system, such as an Internet Protocol Television (IPTV) media system. Communication system 400 can be overlaid or operably coupled with system 100 of FIG. 1 as another representative embodiment of communication system 400. For instance, one or more devices illustrated in the communication system 400 of FIG. 4 can allow for temporary suspension of actions initiated by icons presented at the particular device so that a user can probe the icons and learn what actions the icons will initiate. The probing can cause a second (or more) communication device to present identification information describing the particular actions of the icon(s) being probed.

The IPTV media system can include a super head-end office (SHO) 410 with at least one super headend office server (SHS) 411 which receives media content from satellite and/or terrestrial communication systems. In the present context, media content can represent, for example, audio content, moving image content such as 2D or 3D videos, video games, virtual reality content, still image content, and combinations thereof. The SHS server 411 can forward packets associated with the media content to one or more video head-end servers (VHS) 414 via a network of video head-end offices (VHO) 412 according to a multicast communication protocol.

The VHS 414 can distribute multimedia broadcast content via an access network 418 to commercial and/or residential buildings 402 housing a gateway 404 (such as a residential or commercial gateway). The access network 418 can represent a group of digital subscriber line access multiplexers (DSLAMs) located in a central office or a service area interface that provide broadband services over fiber optical links or copper twisted pairs 419 to buildings 402. The gateway 404 can use communication technology to distribute broadcast signals to media processors 406 such as Set-Top Boxes (STBs) which in turn present broadcast channels to media devices 408 such as computers or television sets managed in some instances by a media controller 407 (such as an infrared or RF remote controller).

The gateway 404, the media processors 406, and media devices 408 can utilize tethered communication technologies (such as coaxial, powerline or phone line wiring) or can operate over a wireless access protocol such as Wireless Fidelity (WiFi), Bluetooth®, Zigbee®, or other present or next generation local or personal area wireless network technologies. By way of these interfaces, unicast communications can also be invoked between the media processors 406 and subsystems of the IPTV media system for services such as video-on-demand (VoD), browsing an electronic programming guide (EPG), or other infrastructure services.

A satellite broadcast television system 429 can be used in the media system of FIG. 4. The satellite broadcast television system can be overlaid, operably coupled with, or replace the IPTV system as another representative embodiment of communication system 400. In this embodiment, signals transmitted by a satellite 415 that include media content can be received by a satellite dish receiver 431 coupled to the building 402. Modulated signals received by the satellite dish receiver 431 can be transferred to the media processors 406 for demodulating, decoding, encoding, and/or distributing broadcast channels to the media devices 408. The media processors 406 can be equipped with a broadband port to an Internet Service Provider (ISP) network 432 to enable interactive services such as VoD and EPG as described above.

In yet another embodiment, an analog or digital cable broadcast distribution system such as cable TV system 433 can be overlaid, operably coupled with, or replace the IPTV system and/or the satellite TV system as another representative embodiment of communication system 400. In this embodiment, the cable TV system 433 can also provide Internet, telephony, and interactive media services. System 400 enables various types of interactive television and/or services including IPTV, cable and/or satellite.

The subject disclosure can apply to other present or next generation over-the-air and/or landline media content services system.

Some of the network elements of the IPTV media system can be coupled to one or more computing devices 430, a portion of which can operate as a web server for providing web portal services over the ISP network 432 to wireline media devices 408 or wireless communication devices 416.

The media processors 406 and wireless communication devices 416 can be provisioned with software functions 464 and 466, respectively, to utilize enable presenting identification information associated with icons being presented at a communication device. For instance, functions 464 and 466 of media processors 406 and wireless communication devices 416 can be similar to the functions described for the communication devices 110 and 175, respectively of FIG. 1 and in accordance with data flow 200 of FIG. 2.

Multiple forms of media services can be offered to media devices over landline technologies such as those described above. Additionally, media services can be offered to media devices by way of a wireless access base station 417 operating according to common wireless access protocols such as Global System for Mobile or GSM, Code Division Multiple Access or CDMA, Time Division Multiple Access or TDMA, Universal Mobile Telecommunications or UMTS, World interoperability for Microwave or WiMAX, Software Defined Radio or SDR, Long Term Evolution or LTE, and so on. Other present and next generation wide area wireless access network technologies can be used in one or more embodiments of the subject disclosure.

Figure 5:
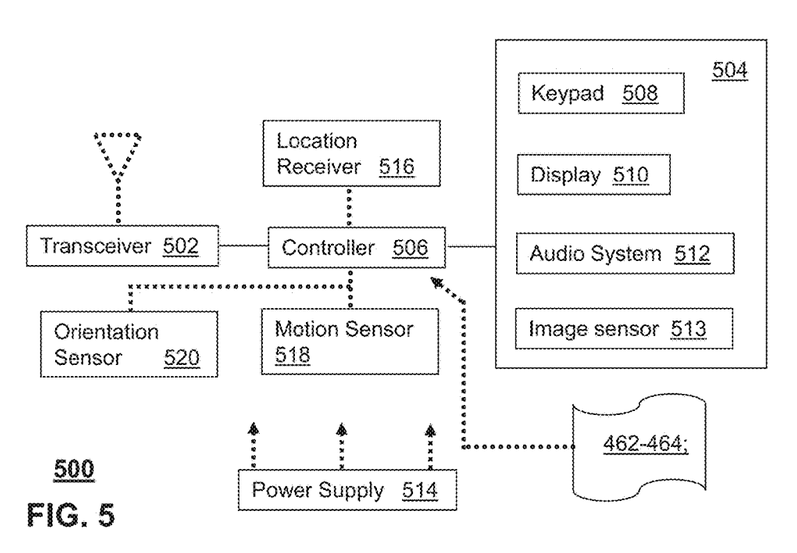
FIG. 5 depicts an illustrative embodiment of a communication device.

FIG. 5 depicts an illustrative embodiment of a communication device 500. Communication device 500 can serve in whole or in part as an illustrative embodiment of the devices depicted in FIGS. 1 and/or 2, and FIGS. 4-5 and can be configured to perform portions of the data flow 200 of FIG. 2.

Communication device 500 can comprise a wireline and/or wireless transceiver 502 (herein transceiver 502), a user interface (UI) 504, a power supply 514, a location receiver 516, a motion sensor 518, an orientation sensor 520, and a controller 506 for managing operations thereof. The transceiver 502 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1x, UMTS/HSDPA, GSM/GPRS, TDMA/EDGE, EV/DO, WiMAX, SDR, LTE, as well as other next generation wireless communication technologies as they arise. The transceiver 502 can also be adapted to support circuit-switched wireline access technologies (such as PSTN), packet-switched wireline access technologies (such as TCP/IP, VoIP, etc.), and combinations thereof.

The UI 504 can include a depressible or touch-sensitive keypad 508 with a navigation mechanism such as a roller ball, a joystick, a mouse, or a navigation disk for manipulating operations of the communication device 500. The keypad 508 can be an integral part of a housing assembly of the communication device 500 or an independent device operably coupled thereto by a tethered wireline interface (such as a USB cable) or a wireless interface supporting for example Bluetooth®. The keypad 508 can represent a numeric keypad commonly used by phones, and/or a QWERTY keypad with alphanumeric keys. The UI 504 can further include a display 510 such as monochrome or color LCD (Liquid Crystal Display), OLED (Organic Light Emitting Diode) or other suitable display technology for conveying images to an end user of the communication device 500. In an embodiment where the display 510 is touch-sensitive, a portion or all of the keypad 508 can be presented by way of the display 510 with navigation features.

The display 510 can use touch screen technology to also serve as a user interface for detecting user input. As a touch screen display, the communication device 500 can be adapted to present a user interface with graphical user interface (GUI) elements that can be selected by a user with a touch of a finger. The touch screen display 510 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 510 can be an integral part of the housing assembly of the communication device 500 or an independent device communicatively coupled thereto by a tethered wireline interface (such as a cable) or a wireless interface.

The UI 504 can also include an audio system 512 that utilizes audio technology for conveying low volume audio (such as audio heard in proximity of a human ear) and high volume audio (such as speakerphone for hands free operation). The audio system 512 can further include a microphone for receiving audible signals of an end user. The audio system 512 can also be used for voice recognition applications. The UI 504 can further include an image sensor 513 such as a charged coupled device (CCD) camera for capturing still or moving images.

The power supply 514 can utilize common power management technologies such as replaceable and rechargeable batteries, supply regulation technologies, and/or charging system technologies for supplying energy to the components of the communication device 500 to facilitate long-range or short-range portable applications. Alternatively, or in combination, the charging system can utilize external power sources such as DC power supplied over a physical interface such as a USB port or other suitable tethering technologies.

The location receiver 516 can utilize location technology such as a global positioning system (GPS) receiver capable of assisted GPS for identifying a location of the communication device 500 based on signals generated by a constellation of GPS satellites, which can be used for facilitating location services such as navigation. The motion sensor 518 can utilize motion sensing technology such as an accelerometer, a gyroscope, or other suitable motion sensing technology to detect motion of the communication device 500 in three-dimensional space. The orientation sensor 520 can utilize orientation sensing technology such as a magnetometer to detect the orientation of the communication device 500 (north, south, west, and east, as well as combined orientations in degrees, minutes, or other suitable orientation metrics).

The communication device 500 can use the transceiver 502 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 506 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 500.

Other components not shown in FIG. 5 can be used in one or more embodiments of the subject disclosure. For instance, the communication device 500 can include a reset button (not shown). The reset button can be used to reset the controller 506 of the communication device 500. In yet another embodiment, the communication device 500 can also include a factory default setting button positioned, for example, below a small hole in a housing assembly of the communication device 500 to force the communication device 500 to re-establish factory settings. In this embodiment, a user can use a protruding object such as a pen or paper clip tip to reach into the hole and depress the default setting button. The communication device 500 can also include a slot for adding or removing an identity module such as a Subscriber Identity Module (SIM) card. SIM cards can be used for identifying subscriber services, executing programs, storing subscriber data, and so forth.

The communication device 500 as described herein can operate with more or less of the circuit components shown in FIG. 5. These variant embodiments can be used in one or more embodiments of the subject disclosure.

The communication device 500 can be adapted to perform the functions of communication device 110, 175, the media processor 406, and/or the media devices 408. It will be appreciated that the communication device 500 can also represent other devices that can operate in system 100 of FIG. 1, communication system 400 of FIG. 4 such as a gaming console and a media player. In addition, the controller 506 can be adapted in various embodiments to perform the functions 462-464, respectively.

Upon reviewing the aforementioned embodiments, it would be evident to an artisan with ordinary skill in the art that said embodiments can be modified, reduced, or enhanced without departing from the scope of the claims described below. For example, the communication device 175 can be a dedicated device that is in communication with the communication device 110 and is dedicated to presenting the identification information provided from the communication device 110. In another embodiment, the communication device 175 can be an auxiliary device of the communication device 110 that renders information according to commands transmitted from the communication device, including a headset, a display screen, a braille glove, and so forth. For instance, the communication device 175 may be an output only device. In another embodiment, the communication device 175 may have the capability to receive limited user input, such as user input associated with preferences for presenting the identification information (e.g., audibly, visually, haptically) but not have the capability of providing communication services independent of the communication device 110. In another embodiment, the communication device 175 can be a fully functioning device capable of providing communication services independent of the communication device 110 but which is utilized for presenting the identification information responsive to receiving the metadata from the communication device 110.

In one or more embodiments, the communication device 175 can be multiple devices. For example, the communication device 110 can be probed and a first portion of identification information for the icon(s) can be presented at a television display and a second portion of the identification information can be presented audibly at a mobile device, where the communication device, the television display and the mobile device are all in proximity to each other.

Other embodiments can be used in the subject disclosure.

It should be understood that devices described in the exemplary embodiments can be in communication with each other via various wireless and/or wired methodologies. The methodologies can be links that are described as coupled, connected and so forth, which can include unidirectional and/or bidirectional communication over wireless paths and/or wired paths that utilize one or more of various protocols or methodologies, where the coupling and/or connection can be direct (e.g., no intervening processing device) and/or indirect (e.g., an intermediary processing device such as a router).

Figure 6:
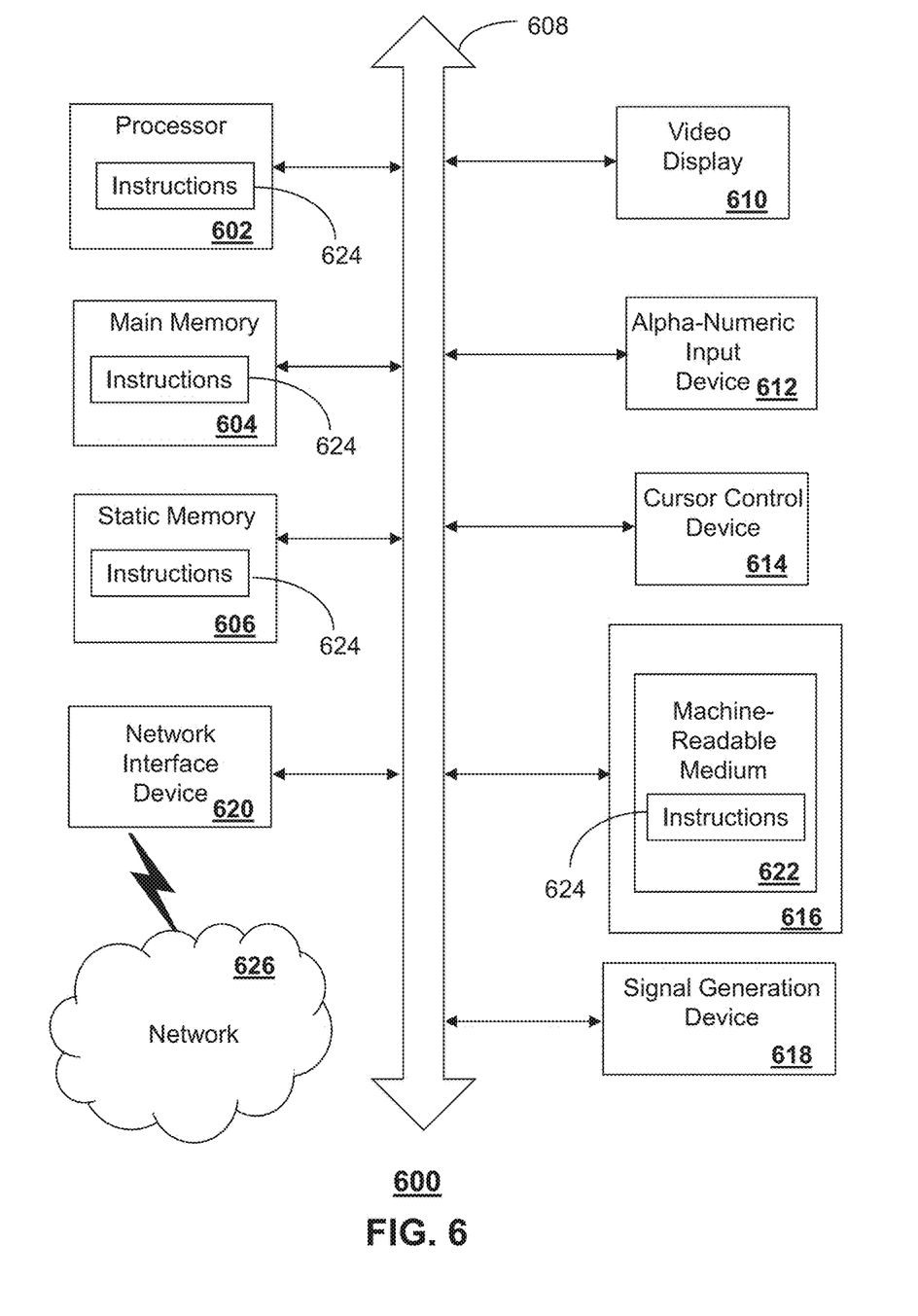
FIG. 6 is a diagrammatic representation of a machine in the form of a computer system within which a set of instructions, when executed, may cause the machine to perform any one or more of the methods described herein.

FIG. 6 depicts an exemplary diagrammatic representation of a machine in the form of a computer system 600 within which a set of instructions, when executed, may cause the machine to perform any one or more of the methods described above. One or more instances of the machine can operate, for example, as the communication device 110 and/or 175 present information descriptive of icons that are in a Graphical User Interface (GUI) or on a touch sensitive display of a communication device where the information can be rendered or otherwise presented on another device which can facilitate the ability of a user to comprehend what actions are associated with the particular icons. In some embodiments, the machine may be connected (e.g., using a network 626) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 600 may include a processor (or controller) 602 (e.g., a central processing unit (CPU)), a graphics processing unit (GPU, or both), a main memory 604 and a static memory 606, which communicate with each other via a bus 608. The computer system 600 may further include a display unit 610 (e.g., a liquid crystal display (LCD), a flat panel, or a solid state display). The computer system 600 may include an input device 612 (e.g., a keyboard), a cursor control device 614 (e.g., a mouse), a disk drive unit 616, a signal generation device 618 (e.g., a speaker or remote control) and a network interface device 620. In distributed environments, the embodiments described in the subject disclosure can be adapted to utilize multiple display units 610 controlled by two or more computer systems 600. In this configuration, presentations described by the subject disclosure may in part be shown in a first of the display units 610, while the remaining portion is presented in a second of the display units 610.

The disk drive unit 616 may include a tangible computer-readable storage medium 622 on which is stored one or more sets of instructions (e.g., software 624) embodying any one or more of the methods or functions described herein, including those methods illustrated above. The instructions 624 may also reside, completely or at least partially, within the main memory 604, the static memory 606, and/or within the processor 602 during execution thereof by the computer system 600. The main memory 604 and the processor 602 also may constitute tangible computer-readable storage media.

Dedicated hardware implementations including, but not limited to, application specific integrated circuits, programmable logic arrays and other hardware devices can likewise be constructed to implement the methods described herein. Application specific integrated circuits and programmable logic array can use downloadable instructions for executing state machines and/or circuit configurations to implement embodiments of the subject disclosure. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the subject disclosure, the operations or methods described herein are intended for operation as software programs or instructions running on or executed by a computer processor or other computing device, and which may include other forms of instructions manifested as a state machine implemented with logic components in an application specific integrated circuit or field programmable gate array. Furthermore, software implementations (e.g., software programs, instructions, etc.) including, but not limited to, distributed processing or component/object distributed processing, parallel processing, or virtual machine processing can also be constructed to implement the methods described herein. It is further noted that a computing device such as a processor, a controller, a state machine or other suitable device for executing instructions to perform operations or methods may perform such operations directly or indirectly by way of one or more intermediate devices directed by the computing device.

While the tangible computer-readable storage medium 622 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the subject disclosure. The term "non-transitory" as in a non-transitory computer-readable storage includes without limitation memories, drives, devices and anything tangible but not a signal per se.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are from time-to-time superseded by faster or more efficient equivalents having essentially the same functions. Wireless standards for device detection (e.g., RFID), short-range communications (e.g., Bluetooth®, WiFi, Zigbee®), and long-range communications (e.g., WiMAX, GSM, CDMA, LTE) can be used by computer system 600.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. The exemplary embodiments can include combinations of features and/or steps from multiple embodiments. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

Less than all of the steps or functions described with respect to the exemplary processes or methods can also be performed in one or more of the exemplary embodiments. Further, the use of numerical terms to describe a device, component, step or function, such as first, second, third, and so forth, is not intended to describe an order or function unless expressly stated so. The use of the terms first, second, third and so forth, is generally to distinguish between devices, components, steps or functions unless expressly stated otherwise. Additionally, one or more devices or components described with respect to the exemplary embodiments can facilitate one or more functions, where the facilitating (e.g., facilitating access or facilitating establishing a connection) can include less than every step needed to perform the function or can include all of the steps needed to perform the function.

In one or more embodiments, a processor (which can include a controller or circuit) has been described that performs various functions. It should be understood that the processor can be multiple processors, which can include distributed processors or parallel processors in a single machine or multiple machines. The processor can be used in supporting a virtual processing environment. The virtual processing environment may support one or more virtual machines representing computers, servers, or other computing devices. In such virtual machines, components such as microprocessors and storage devices may be virtualized or logically represented. The processor can include a state machine, application specific integrated circuit, and/or programmable gate array including a Field PGA. In one or more embodiments, when a processor executes instructions to perform "operations", this can include the processor performing the operations directly and/or facilitating, directing, or cooperating with another device or component to perform the operations.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A first communication device comprising:
a touch sensitive display;
a processor coupled with the touch sensitive display; and
a memory that stores executable instructions that, when executed by the processor, facilitate performance of operations, comprising:
presenting a first icon on the touch sensitive display;
presenting a second icon on the touch sensitive display, wherein the second icon is associated with an initiation of an action for a communication service;
responsive to detecting the first user interaction maintaining contact with the first icon, temporarily disabling the initiation of the action for the communication service while maintaining contact with the first icon;
responsive to detecting a second user interaction with the second icon during the maintaining of the contact with the first icon, transmitting an identification signal to a second communication device that causes the second communication device to present identification information describing the action for the communication service associated with the second icon, wherein the identification information includes identification indicia of the second icon, wherein the identification information is presented by the second communication device via audio communication, haptic communication, visual communication, or any combination thereof according to a selected presentation format based on a user input or a user preference; and
responsive to detecting a third user interaction terminating contact with the first icon, re-enabling the initiation of the action for the communication service.

2. The first communication device of claim 1, wherein the transmitting of the identification signal to the second communication device is via wireless communication, wherein the presenting of the second icon on the touch sensitive display comprises graphically presenting an identification indicia for the action.

3. The first communication device of claim 2, wherein the action for the communication service comprises transmitting first data from the first communication device to a server, receiving second data from the server at the first communication device, or any combination thereof.

4. The first communication device of claim 1, wherein the operations further comprise:
storing metadata in the memory, wherein the metadata includes the identification information describing the action for the communication service; and
generating the identification signal according to the metadata responsive to the first user interaction with the first icon and the second user interaction with the second icon.

5. The first communication device of claim 1, wherein the operations further comprise:
receiving a selection indicating the selected presentation format to be utilized at the second communication device; and
transmitting a format signal to the second communication device that causes the second communication device to present the identification information via the audio communication, the haptic communication, the visual communication, or the any combination thereof according to the selected presentation format.

6. The first communication device of claim 1, wherein the operations further comprise:
presenting a third icon on the touch sensitive display, wherein the third icon is associated with the communication service, wherein user interaction with the third icon does not initiate any action for the communication service;
detecting a fourth user interaction with the third icon; and
responsive to the fourth user interaction with the third icon, transmitting a supplemental signal to the second communication device that causes the second communication device to present supplemental information describing the communication service.

7. A non-transitory machine-readable storage medium, comprising executable instructions that, when executed by a processor of a first communication device, facilitate performance of operations, comprising:
presenting a first icon on a touch sensitive display of the first communication device;
presenting a second icon on the touch sensitive display, wherein the second icon is associated with an initiation of an action for a communication service;
responsive to detecting a first user interaction maintaining contact with the first icon, temporarily disabling the initiation of the action for the communication service while maintaining contact with the first icon;
responsive to detecting a second user interaction with the second icon during the maintaining of the contact with the first icon, transmitting an identification signal to a second communication device that causes the second communication device to present identification information describing the action for the communication service associated with the second icon, wherein the identification information includes identification indicia of the second icon, wherein the identification information is presented by the second communication device via audio communication, haptic communication, visual communication, or any combination thereof according to a selected presentation format based on a user input or a user preference; and
responsive to detecting a third user interaction terminating contact with the first icon, re-enabling the initiation of the action for the communication service.

8. The non-transitory machine-readable storage medium of claim 7, wherein the transmitting of the identification signal to the second communication device is via wireless communication.

9. The non-transitory machine-readable storage medium of claim 7, wherein the identification information presented by the second communication device describing the action for the communication service includes the identification indicia and additional information further describing the action for the communication service.

10. The non-transitory machine-readable storage medium of claim 7, wherein the operations further comprise:
storing metadata in a memory of the first communication device, wherein the metadata includes the identification information describing the action for the communication service; and
generating the identification signal according to the metadata responsive to the first user interaction with a control button and the second user interaction with the second icon.

11. The non-transitory machine-readable storage medium of claim 7, wherein the operations further comprise:
receiving a selection indicating the selected presentation format to be utilized at the second communication device; and
a format signal to the second communication device that causes the second communication device to present the identification information via the audio communication, the haptic communication, the visual communication, or the any combination thereof according to the selected presentation format.

12. The non-transitory machine-readable storage medium of claim 7, wherein the operations further comprise:
presenting a third icon on the touch sensitive display, wherein the third icon is associated with the communication service, wherein user interaction with the third icon does not initiate any action for the communication service;
detecting a fourth user interaction with the third icon; and
responsive to the fourth user interaction with the third icon, transmitting a supplemental signal to the second communication device that causes the second communication device to present supplemental information describing the communication service.

13. The non-transitory machine-readable storage medium of claim 7, wherein the presenting of the icon on the touch sensitive display of the first communication device is in a graphical user interface generated by an application being executed by the first communication device, and wherein the application provides access to the communication service.

14. A method comprising:
presenting, by a system including a processor, a first icon on a touch sensitive display;
presenting, by the system, a second icon on the touch sensitive display, wherein the second icon is associated with an initiation of an action for a communication service;
responsive to detecting a first user interaction maintaining contact with the first icon, temporarily disabling, by the system, the initiation of the action for the communication service while maintaining contact with the first icon;
responsive to detecting a second user interaction with the second icon during the maintaining of the contact with the first icon, transmitting, by the system, an identification signal to a communication device that causes the communication device to present identification information describing the action for the communication service associated with the second icon, wherein the identification information includes identification indicia of the second icon, wherein the identification information is presented by the communication device via audio communication, haptic communication, visual communication, or any combination thereof according to a selected presentation format based on a user input or a user preference; and
responsive to detecting a third user interaction terminating contact with the first icon, re-enabling the initiation of the action for the communication service.

15. The method of claim 14,
further comprising generating the identification information associated with the action based on metadata and including only a portion of a description of the action according to a filtering selection.

16. The method of claim 14, wherein the system is a mobile phone, and wherein the transmitting of the identification signal to the communication device is via wireless communication.

17. The method of claim 14, wherein the system is a mobile phone, and wherein the transmitting of the identification signal to the communication device is via a hardwire connection between the system and the communication device.

* * * * *